UNITED STATES PATENT OFFICE.

JOHN HARRIS, OF LAKEWOOD, OHIO.

GAS FOR CUTTING AND WELDING PURPOSES.

1,303,891.      Specification of Letters Patent.      Patented May 20, 1919.

No Drawing.      Application filed June 7, 1917. Serial No. 173,364.

*To all whom it may concern:*

Be it known that I, JOHN HARRIS, a citizen of the United States, residing at Lakewood, in the county of Cuyahoga and State of Ohio, have invented a certain new and useful Improvement in Gases for Cutting and Welding Purposes, of which the following is a full, clear, and exact description.

This invention relates to gases employed with blow pipes for cutting and welding purposes and has for its general object to produce a gas for this purpose which is extremely economical of production and which is of marked efficiency in operation.

What is known in the art as the autogenous welding of steel with blow pipes or torches has hitherto been performed almost exclusively with acetylene, the acetylene being mingled with oxygen for the purpose of producing a neutral or slightly reducing flame. However, the use of this gas is not only expensive, but the neutral flame is short and more or less blunt, whereby the tips are liable to destruction by the heat of the molten metal, and, in the case of cutting, the slots are unnecessarily wide because of the melting of the sides of the slot. Furthermore, the flame is liable to "flash back" within the tips because of the shortness of the cones and the relatively low igniting point of the gas; while the gas, at 200° C., begins to polymerize, producing an excess of carbon in the flame, and requiring for the combustion of such carbon more oxygen than the pipe has been adjusted to supply.

It is the object of my invention to produce a gas which is not only far more economical than acetylene for both cutting and welding purposes but one which, when used for welding purposes, will prevent the formation of the oxid film and thereby secure an ideal weld.

It has been attempted to employ hydrogen for the purpose of welding, but the use of hydrogen has been found to be impracticable. It is extremely difficult to so adjust the hydrogen and oxygen as to produce a neutral flame which is sufficiently hot for welding purposes. When so adjusted, however, the products of combustion are water vapor which, striking the red hot iron in the presence of oxygen from the atmosphere, will be dissociated into hydrogen and oxygen, the oxygen producing a film of oxid upon the molten added metal and the hydrogen being consumed by the oxygen from the atmosphere. Furthermore, the combustion of hydrogen results in a colorless flame, so that it is extremely difficult to set the flame at the proper point with reference to the metal.

I am able to obviate the objections by mixing with hydrogen about 10% by volume of acetylene. The combustion of this mixture with oxygen at the blow pipe tip will result in a flame of higher temperature than that secured by the combustion of hydrogen, and this flame will possess such a distinctive color as will enable the pipe conveniently to be set or adjusted with reference to the work as well as to secure a neutral flame for welding purposes; and this flame or cone is longer and is more pointed than one produced by acetylene alone, due to the fact that the igniting point of the mixture is higher than the igniting point of acetylene, and due to the fact that the temperature of the flame produced by the mixture is lower than the temperature of an acetylene flame. Furthermore, the acetylene constituent of the mixture having a lower ignition point than the hydrogen, the cone or flame employed for welding purposes will burn within and be protected from radiation by an envelop of hydrogen burning in the presence of some of the oxygen supplied from the pipe as well as in the presence of oxygen flowing in from the atmosphere. Furthermore, as is well known, the temperature of the acetylene, burning in the mixture of hydrogen and oxygen, is above that at which the hydrogen alone, or the hydrogen constituent of the acetylene, will combine with oxygen to form water; and the envelop of burning hydrogen prevents the reduction of this temperature through radiation to the point at which hydrogen will so combine with oxygen to form water. Hence no film of oxid can be produced upon the iron, provided that ordinary precautions are taken for producing the neutral flame due to the combustion of the acetylene at the edges of the inner cone. I am, therefore, enabled to conveniently set the flame for welding purposes and to secure an extremely efficient weld. Furthermore, I am enabled to utilize for this purpose a gas containing as high as 90% of hydrogen and hence costing but little more than hydrogen alone, which has hitherto been found unsuitable for welding purposes.

By mixing hydrogen with acetylene in about the proportions set forth I am enabled to secure the following advantages:

(a) A gas nearly as cheap as hydrogen, and the hydrogen constituent whereof has hitherto been allowed to escape as waste in plants where oxygen is manufactured by the electrolytic process or by the alkali process.

(b) A gas having a hotter welding and preheating flame than hydrogen alone, resulting in a quicker welding and a quicker preheating operation than can be secured by hydrogen.

(c) A gas for welding purposes which, over hydrogen, can be quickly adjusted to secure a neutral flame.

(d) A gas which will produce a readily visible cutting and welding flame, the temperature whereof is higher than that produced by hydrogen and the igniting point whereof is higher than acetylene.

(e) A gas which will enable welding to be performed without oxidation or carbonization of the weld.

(f) A gas which will enable the blow-pipe tips to be employed with less liability to destruction through close proximity to the molten metal than is the case with acetylene.

(g) A gas which will reduce to a minimum the danger of the flame flashing back into the tips, due to the fact that the igniting point of the gas is higher than acetylene and the neutral flame or cone is longer than that produced by acetylene.

(h) A gas which will enable metal to be cut with narrower slots, and hence with less consumption of gas and metal, than is possible with acetylene.

Having thus described my invention, what I claim is:—

A gas for the purposes described comprising a mixture of hydrogen and acetylene with substantially pure oxygen, the acetylene constituting approximately ten (10) per cent. by volume of the hydrogen.

In testimony whereof, I hereunto affix my signature.

JOHN HARRIS.